United States Patent [19]
Plasser et al.

[11] 3,750,299
[45] Aug. 7, 1973

[54] TRACK APPARATUS WITH LASER BEAM REFERENCE

[76] Inventors: Franz Plasser; Josef Theurer, both of Johannesgasse, 1010 Vienna, Austria

[22] Filed: Aug. 30, 1971

[21] Appl. No.: 176,129

Related U.S. Application Data

[62] Division of Ser. No. 3,762, Jan. 19, 1970, Pat. No. 3,706,284.

[30] Foreign Application Priority Data

Jan. 22, 1969 Austria .................................. 646/69

[52] U.S. Cl. .......................... 33/287, 104/7 R, 104/8
[51] Int. Cl. ........................ E01b 35/08, E01b 35/10
[58] Field of Search .................. 33/287, 1 H; 104/7, 104/7 B, 8, 12

[56] References Cited
UNITED STATES PATENTS

| 3,381,626 | 5/1968 | Fafan et al. | 33/287 |
| 3,591,926 | 7/1971 | Trice, Jr. | 33/1 H |

*Primary Examiner*—Drayton E. Hoffman
*Assistant Examiner*—Richard A. Bertsch
*Attorney*—Kurt Kelman

[57] ABSTRACT

A laser beam reference or datum in a track surfacer, liner or surveying apparatus is intercepted by a mask or sensor which is held in a measurably fixed relationship to the grade rail. This sensor is connected with the track lining or leveling tool, or a track position recorder or signaling instrument, and control signals from the sensor in response to laser beam impingement thereon operate the respective tool or recording or signaling instrument.

14 Claims, 19 Drawing Figures

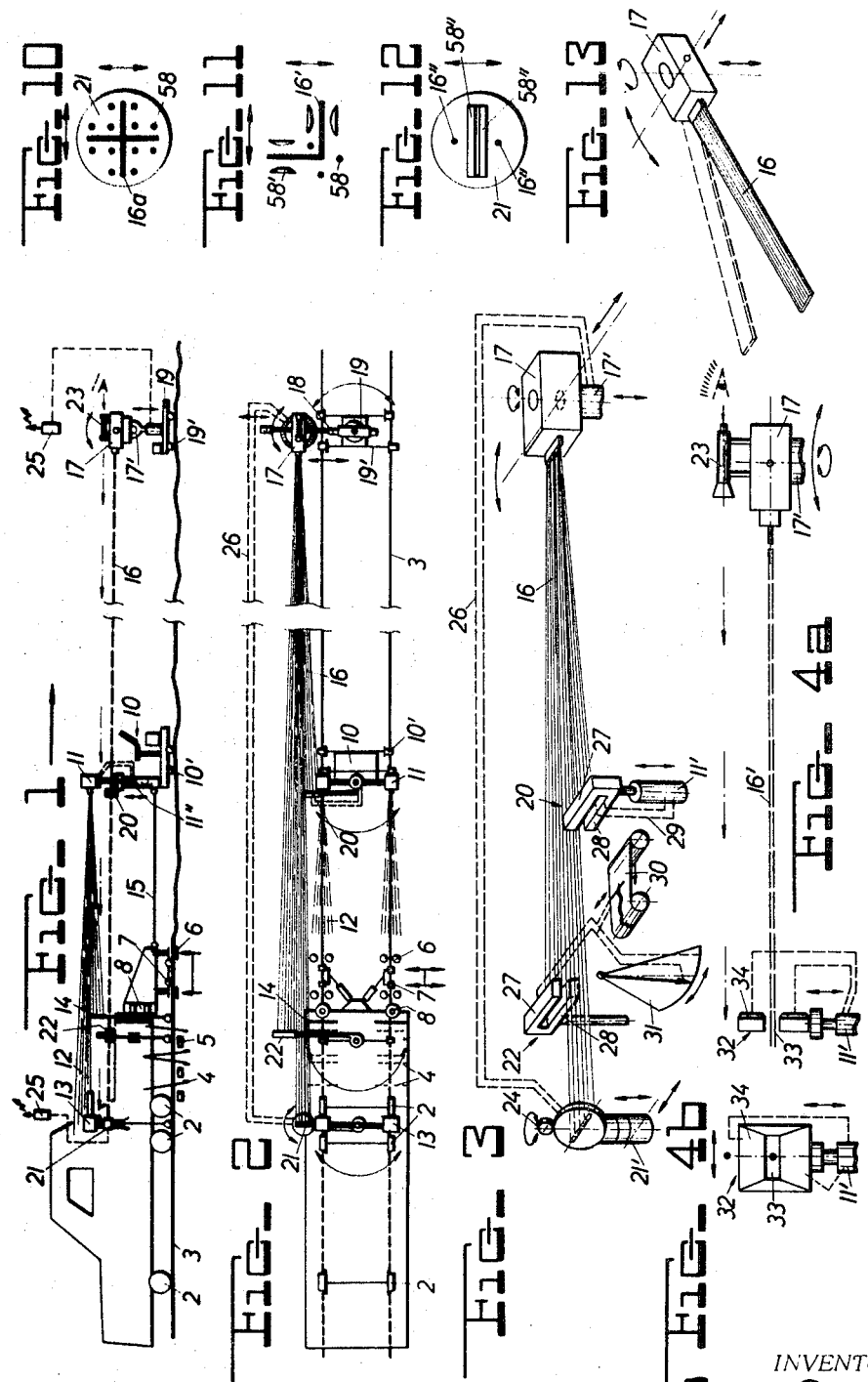

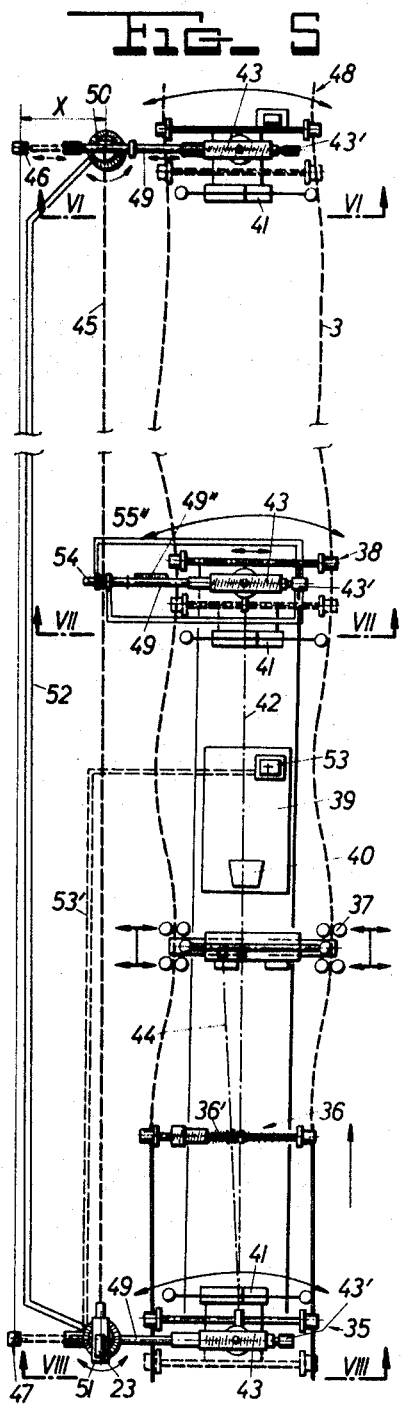

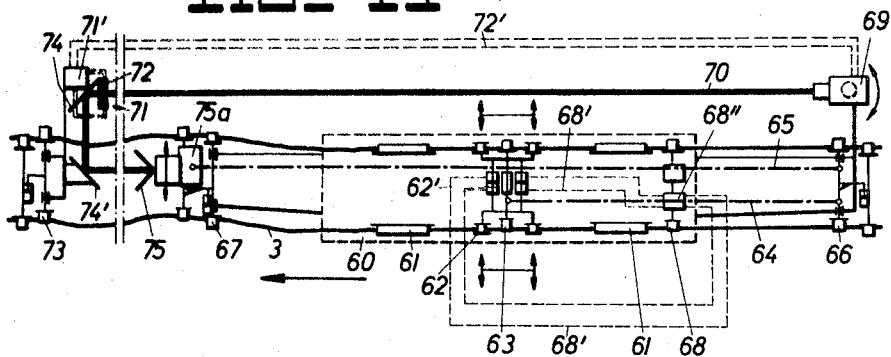
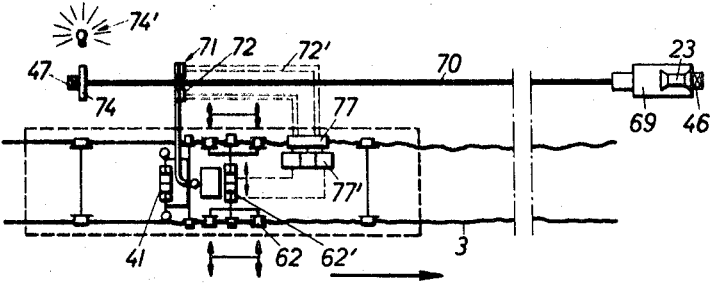
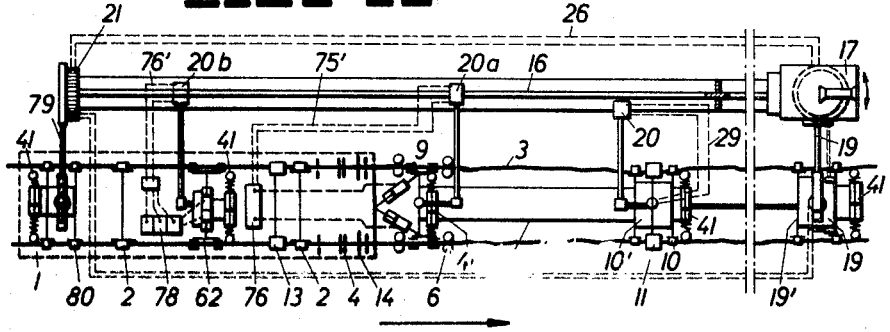

PATENTED AUG 7 1973 3,750,299

INVENTORS
FRANZ PLASSER
BY JOSEF THEURER

AGENT

TRACK APPARATUS WITH LASER BEAM REFERENCE

This is a division of copending application Ser. No. 3,762, filed Jan. 19, 1970, now U.S. Pat. No. 3,706,284 dated Dec. 19, 1972.

The present invention relates to track surveying apparatus for recording or signaling the position of a track in relation to a laser beam reference or datum.

In such apparatus, there is provided a laser beam emitter, if desired a laser beam receiver associated with the emitter so as to define the path of the laser beam, and a laser beam sensing means, such as a mask or sensor, in the path of the laser beam. Means is provided for surveying the track position and a recording or signaling instrument for indicating the track position is provided.

A laser beam reference is very useful in track working operations because of its long reach as well as its total insensitivity to weather conditions, the sharpness of such a beam, and for other reasons. It is accordingly a primary object of this invention to provide a practically useful laser beam reference for track surveying to make such an apparatus useful for a variety of track surveying operations, to construct it with a minimum of sturdy and easily operable parts, and thus to reduce service of the apparatus to a minimum while making its operation simple but exceedingly precise.

It is another object of the invention to provide such a laser beam reference for controlling the correction reference system as well as for simply recording or signaling the misalignment of the track.

The above and othe objects are accomplished according to an essential characteristic of the present invention by providing a laser beam sensing means in the path of the laser beam, which sensing means is connected with the track position indicating means, for instance a track position recorder or a movable anchor for one end of a reference line belonging to a reference system in relation to which the track moving means corrects the track position. Means is provided according to this essential characteristic of the invention for holding the laser beam sensing means in a measurably fixed relationship, preferably in immediate contact, with the selected grade rail of the track. Laser beam sensitive elements on the laser beam sensing means produce control signals upon impingement of the laser beam on these elements for actuating the control means operating the track position indicating means, i.e. the movement of the reference line anchor, thus assuring proper positioning of the reference line.

The precision of track surveying required in modern track working apparatus is assured according to the invention by holding the laser beam sensor in a fixed relationship to the grade rail so that an accurate reference or datum is formed thereby, and the laser beam responsive elements on the sensor automatically and continuously survey the track. Thus, it has been shown to be insufficient merely to provide a laser beam reference and sensing means therefor to obtain a practically useful system. Rather, it has been necessary to solve the problem of accurately positioning the laser beam, i.e. its emitter and receiver, as well as the sensor in the path of the beam, in respect of the track to be corrected, and to coordinate all these parts of the system in a manner that assures their preferably automatic cooperation with the movable parts of the track surveying means without an unduly complex arrangement which would require excessive expenditure in service and undue skill in operation. The present invention has solved this problem, making use also of the property of laser beams of being much sharper and more well defined than conventional light beams, for instance, so as to form an exact reference or datum but also of their intensity and readily controllable change of intensity to make laser beam sensitive elements most responsive thereto under all conditions.

If the apparatus is used for lining, the laser beam sensor is laterally pressed against the grade rail. In leveling operations, the laser beam sensor will be held in fixed vertical relation to the grade rail by its own weight.

The apparatus of this invention works with a true laser beam of well defined cross section which may be rectangular and extend in a single plane, or may extend in two perpendicularly intersecting planes forming a cruciform or L-shaped cross section. As is known, a laser beam maintains its high definition and intensity for considerable distances so that a number of sensors may be placed in its path to control various track correction recordings. The sensors may then be so placed in the path of the laser beam that they mask only a portion of the beam, permitting one sensor, for instance, to control track leveling, another sensor to control track lining, and so on, while a final portion may be received at the receiver to control the position of the laser beam which is then automatically determined by the positions of the laser beam emitter and receiver.

In accordance with one feature of the invention, the sensors and preferably the receiver of the laser beam have laser beam sensitive cells or elements so arranged about a center region that any deviation of the beam from its centered position will immediately produce control signals which will move the sensor and/or receiver back into its centered position. Thus, the sensor may be an apertured stop or mask with a central aperture having the same cross section as that of the laser beam, which aperture is surrounded by light-and/or temperature sensitive elements which produce control signals for moving the sensor back into its centered position upon impingement of the laser beam on such elements. The receiver may have a similarly arranged pattern of laser beam sensitive elements about a non-sensitive central region. Thus, the entire laser beam reference or datum will remain constantly and automatically focussed while simultaneously being in a fixed relationship to the grade rail.

It is also possible within the principles of the present invention to use fixed points or markers along the track as targets for the laser beam, which points have a given distance from the grade rail, and to survey the track position in respect of such fixed points with the laser beam as a reference. In such apparatus, the laser beam emitter is on an adjustable support movable along the track, which support may be adjusted by remote control in respect of the selected grade rail of the track.

The above and other objects, advantages and features of the present invention will become more apparent in the following detailed description of certain now preferred embodiments thereof, taken in conjunction with the accompanying drawing wherein FIG. 1 is a schematic side view of a combined track tamper-surfacer-liner with an embodiment of the reference system of this invention;

FIG. 2 is a top view of the embodiment of FIG. 1;

FIG. 3 is a schematic perspective view of essential parts of the reference system;

FIGS. 4a and 4b show a modified detail of the reference system in side and front view, respectively;

FIG. 5 is a schematic top view of a track liner with an embodiment of the reference system of the invention;

FIG. 6 is a section along line VI—VI of FIG. 5;

FIG. 7 is a section along line VII—VII of FIG. 5;

FIG. 8 is a section along line VIII—VIII of FIG. 5;

FIG. 9 is a schematic top view of a modification of the system of FIGS. 5 to 8;

FIGS. 10 to 12 illustrate various embodiments of laser beam receivers;

FIG. 13 is a perspective view of a planar laser beam and its emitter;

FIGS. 14 to 16 are schematic top views of various track correction machines embodying the invention.

Figure 17:
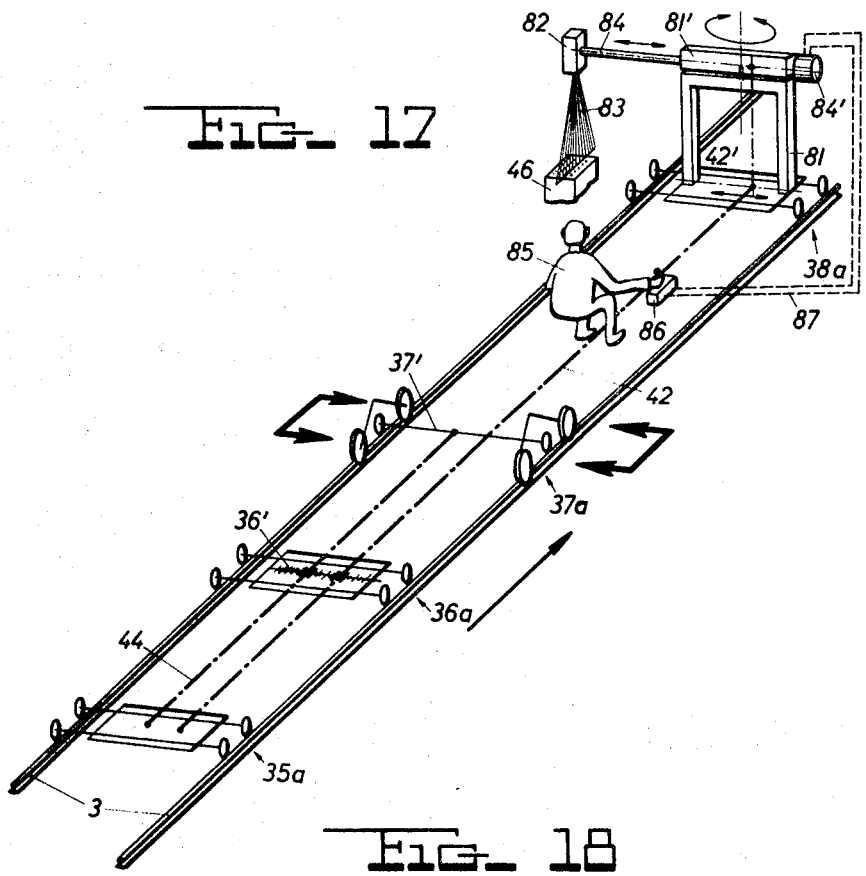
FIGS. 17 and 18 are perspective views of additional machines embodying the invention.

Referring now to the drawing, wherein like reference numerals designate like parts functioning in a like manner, FIGS. 1 and 2 show a generally conventional combined track tamper-surfacer-liner which has a machine frame 1 mounted on three running gears 2 for mobility on track rails 3. The illustrated track working assembly carries a pair of tamping units 4 arranged to tamp two immediately adjacent ties 5 simultaneously, in the manner more particularly disclosed and claimed in our U.S. Pat. Nos. 3,372,651 and 3,357,366. The machine frame 1 also carries roller lining units 6 each of which includes two flanged rollers 7 glidingly gripping the heads of rails 3. Lining cylinders 9 are connected to the lining units for transmitting laterally directed power to a respective rail for pressing the track into the correct lateral position, as is conventional. The track lining actuating means 6, 7, 9 is vertically adjustable on the front end of the machine frame 1, as seen in the working direction of the machine indicated by a horizontal arrow, by means of a pressure fluid drive 8.

The reference system for lifting the track to a desired level or grade includes a reference consisting of a conical light beam 12 emitted from sender 11 mounted on bogie 10, which is positioned in an uncorrected track section, and received by receiver 13 mounted on machine frame 1 for free vertical movement in respect thereto and resting directly on track 3 in a track section that has been corrected, the receiver 13 thus being vertically movable with this track section when the same is corrected. A light beam interceptor or mask 14 is also mounted for free vertical movement on track 3 in a track section intermediate the sender and receiver. As is conventional in this type of track grading reference system, actuation of the lifting cylinder 8 is terminated and the correct track level is indicated when the mask 14 has moved upwardly with track 3 to the point where it intercepts the lower portion of the conical light bundle 12 to leave a lower straight line of light parallel to the desired level of the track and the light receiver below this line is prevented from receiving light.

The bogie 10, which may also carry track measuring and recording devices, such as cross levels, is connected to the front of the machine frame 1 by means of spacing rod 15, which keeps the bogie at a predetermined distance from the frame as the track working apparatus proceeds along the track during the surfacing and/or lining operation, the corrected track section always lying behind the units 6 while the bogie 10 runs on the uncorrected track section.

To avoid local falsification of the track correction due to an unusual low or high point in the uncorrected track section, the vertical position of light emitter 11 is constantly observed by means of a scale 11'' on bogie 10. For this purpose, a source or emitter 17 of a planar laser beam 16 is mounted on front bogie 19. The laser beam is conical in a transverse plane substantially parallel to the plane of the track. The laser beam source 17 is mounted on a vertically adjustable carrier support 18 on bogie 19 which may be pivoted 180° about a vertical axis so that the laser beam source 17 may be selectively positioned into association with a selected rail of the track, as best seen in FIG. 2. Such adjustment is necessary when the grade rail is changed, i.e. when adjacent track sections form curves extending in opposite directions. A scale is associated with the laser beam source to facilitate such adjustment in track curves. The laser beam source 17 is additionllly pivotal about a horizontal axis extending transversely of the track.

The front bogie 19 has its own drive, which is preferably actuated by remote control, and runs on two running gears 19'. The running gears have flanged wheels or rollers which are pressed against the selected grade rail so as to constitute a proper reference in respect of the track and to bring the laser beam source 17 into proper relationship to the reference system. Lateral pressure may be exerted in any convenient manner, such as by jacking means, as is well known.

The bogie 10 also runs on two running gears 10' which have flanged wheels or rollers which are pressed against the selected grade rail in any convenient manner. A laser beam mask or interceptor 20 is mounted on bogie 10 for 180° pivotal movement about a vertical axis so that is may be swung around to a selected grade rail in the same manner as the laser beam source 17.

The machine frame 1 carries a laser beam receiver 21 which is also mounted for 180° pivotal movement about a vertical axis so that it, too, may be swung around to the selected grade rail, with laser beam source 17 and laser beam sensing mask 20. The laser beam receiver 21 is mounted in substantial alignment with the light beam receiver 13.

A second laser beam sensor or mask 22 is similarly pivotally mounted on machine frame 1 in substantial alignment with the tamping units 4 for further control of the desired track correction. As best seen in FIG. 2, this mask also is in the path of a portion of the outwardly tapering planar laser beam 16.

The laser beam emitter 17 is first coarsely centered on receiver 21 by viewing a spotboard 24 (FIG. 3) through sight 23, the spotboard being spaced the same distance from the center of the receiver as the sight is from the center of the emitter. Accurate centering of the planar laser beam 16 during the continuous operation of the track correction apparatus is effected automatically by remote control, either by radio 25 (FIG. 1) or by an electrical control circuit 26 (FIGS. 2 and 3). For this purpose, the receiver 21 has a grating or scanning pattern of light- and/or temperature sensitive cells which respond to the laser beam intensity received thereby to produce corresponding electrical control or radio signals for actuating pivoting drive 17' for the emitter 17 and/or pivoting drive 21' for the receiver.

As seen in FIG. 3, the laser beam sensor masks 20 and 22 also carry light- and/or temperature sensitive cells or elements 27 and 28. These radiation responsive elements 27 and 28 extend horizontally above and below a horizontally extending, fixed central region of the masks, i.e. an open slot, the elements 27 and 28 responding to the laser beam intensity received thereby to produce corresponding electrical control signals characteristic of each element for energizing electrical control circuit 29 to actuate the vertical movement of a respective sensor in dependence on the impingement of planar laser beam 16.

The vertical movement of the sensor 20 actuates vertical drive 11' for light beam emitter 11 so that the vertical position of the same is corrected if it is in the wrong vertical position when the bogie 10 is stationed at an unusually low or high point in the uncorrected track section during the continuous advance of the apparatus along the track on which work is done. The vertical adjustment of the sensor 22 may be recorded on a moving band 30. Also, a conventional pendulum device 31 may be mounted in the region of mask 22 to observe and control the superelevation of the track in relation to the plane of laser beam 16. According to an important characteristic of the present invention, all parts of the reference system are pressed into contact with the grade rail to assure accuracy.

As appears clearly from FIGS. 2 and 3, each of the laser beam intercepting means 20 and 22, which are spaced apart along the longitudinal extension of the beam, are arranged to interfere with, or intercept, only a portion of the lateral extension of the planar laser beam so that preferably at least the central portion of the beam is left unmasked and may be received by receiver 21.

In the modification shown in FIGS. 4a and 4b, the laser beam masking means is constituted by a slotted stop 32. While the stop has been shown to define a horizontal slot 33 surrounded by a light- and/or temperature sensitive cell or element 34, this slot may instead extend vertically or be replaced by a circularly shaped aperture. Also, only one side of the stop adjacent the slot or aperture need be light- and/or temperature sensitive, instead of all sides. The illustrated stop is useful in association with the horizontal laser beam 16, as shown in FIG. 13, and a differently shaped and/or positioned aperture would be used with a laser beam of different shape and/or position. As in the previously described modification, the mask 32 is vertically movable by drive 11'.

The mobile track liner illustrated in FIGS. 5 to 8 operates in the manner fully described in Austrian Pat. No. 227,749 and, since conventional, will be described herein only inasmuch as pertinent to the reference system of the present invention. This track working apparatus comprises a series of carriage spaced apart in the direction of track elongation for movement on the track rails on one or two axles. As seen in the working direction, the apparatus comprises a rearmost carriage 35, preceded by a measuring bogie 36, track lining unit 37 and front carriage 38. Preferably, all of these carriages are independently mounted for lateral movement on the underside of the mobile machine frame 39 which has its own running gears (not shown) for mobility on the track. The operator's cab 40 is mounted on the frame 39.

The axles of the carriages have flanged wheels and conventional means is provided for laterally pressing the carriages against the selected grade rail of the track until the flanges of the wheels engage firmly against the selected rail. The lateral pressure means may include a laterally movable second axle (shown in broken lines) or a pair of double-acting jacks 41.

In the reference system used for track alignment according to the above-mentioned patent, a long reference chord 42 extends from rearmost carriage 35 to front carriage 38, passing intermediately positioned measuring bogie 36. The anchor points of the long chord are laterally movable on their respective carriages by a spindle drive 43 rotated by servo motor 43'. The short reference chord 44 has one end point anchored to the rear carriage 35 at the same anchorage as long chord 42 while the other end point of the short chord is anchored to the track lining unit 37 to be laterally moved therewith with track 3 and the roller unit 37 when the latter is actuated, the short reference chord also passing intermediately positioned measuring bogie 36. This two-chord lining system is well known and requires the ordinates on the two chords measured at 36 to be in the same proportion in a track curve as the proportion of lengths of the two chords. The track 3 is laterally moved by roller lining units 37 until the ordinates at 36 have reached this proportion, two chord probes being mounted on screw-threaded spindle 36 for automatically determining the alignment in the manner fully described and claimed in our U. S. Pat. No. 3,314,373.

To avoid local falsification of the track lining due to a sharply out-of-line position of front carriage 38 in the uncorrected track section, the known reference system is associated with a laser beam 45 extending laterally adjacent track 3 in the direction of elongation of the track. The position of the laser beam may be fixed by end points 46 and 47 which may be arranged at regular intervals along the track at a predetermined distance from the theoretical center line of the track.

A foremost carriage 48 precedes the track lining apparatus in the working direction to support the laser beam receiver 50. For this purpose, a spindle drive 43 operated by servo motor 43' is mounted on the carriage, the spindle drive having a support arm 49 projecting laterally beyond the track and supporting the receiver 50 at a predetermined point which may be adjusted by rotation of the spindle drive, regardless of the actual lateral position of the track section. The laser beam receiver 50 is pivotally mounted on the support arm 49. The laser beam source or emitter 51 is similarly pivotally mounted on the support arm 49 projecting laterally beyond the track from spindle drive 43 on rear carriage 38 and whose lateral position is adjustable similar to that of receiver 50. As in the previously described embodiment, the laser beam emitter carries a sight 23 for viewing a spotboard on the receiver so as to focus the emitter on the receiver. A television receiver and screen 53 in the operator's cab is connected to the laser beam emitter to enable the operator to focus the emitter by remote control circuit 53' actuating the pivotal movement of the emitter.

Accurate centering of the laser beam 45 during the continuous operation of the track liner is effected automatically by remote control circuits 52 and/or 53', the control circuits being actuated by signals from the scanning pattern of light- and/or temperature sensitive cells on reciever 50 (see FIG. 6). Automatic focusing is effected by vertically moving and/or pivoting sender 51 and/or receiver 50. As shown in FIG. 7, the laser beam 45 is of rectangular cross section and defines a vertical reference plane extending in the direction of track elongation. This cross sectional shape of beam 45 facilitates the control of the emitter 51 in dependence on the receiver as well as the masking or interception of the beam by sensing means 54 also mounted for lateral movement on support arm 49 of spindle drive 43 which is arranged on the carriage 38. The lateral movement of the mask 54 is controlled automatically by control circuit 55' connected to servo motor 43' of its spindle drive, the control circuit being acutated by signals from light- and/or temperature sensitive elements 55 mounted laterally adjacent the beam 45, as seen in FIG. 7. Thus, the masking or sensing means 54 constitutes a probe for the laser beam and, depending on which of the lateral contact elements 55 is intersected by the laser beam, a corresponding control signal will rotate the spindle drive 43 in one or the other direction to move the probe back into alignment with the beam 45.

When the probe 54 is in perfect alignment with the laser beam 45, i.e. when its elements 55 are out of contact with the beam, the forward end of the longer chord 42 has exactly the same distance from laser beam 45 as its rear end on carriage 35. In a track curve, the lateral adjustment of the arm 49 on carriage 38 takes into account the corresponding ordinate, for which purpose the arm carries scale 49''.

The arms 49 on carriages 35, 38 and 48 may be pivoted 180° about a vertical axis so that they may be associated with the other rail of the track when a change of grade rail is required. The carriages themselves are relatively light and readily exchangeable so that the apparatus may be used in reverse working direction.

It is not essential for the laser beam emitter and receiver to be mounted on laterally adjustable support arms. They may be moved or fixed at a fixed lateral distance x from fixed points 46 and 47 which have a predetermined lateral distance from the grade rail or center line of the track. For instance, as indicated in FIG. 6, the receiver may be clamped to a stake 46 at 49' (the emitter being similarly mounted). Or, as shown in FIG. 8, the emitter 51 may be mounted on a third rail 56 (the receiver being similarly mounted). As indicated in broken lines in FIG. 5, the outer ends of respective support arms 49 may contact the fixed points 46 and 47.

FIG. 9 schematically illustrates a different reference system for lining, this system, too, being associated with a laser beam 45. In this system a single reference line 57 is provided whose front end is moved into a predetermined position in relation to the laser beam 45 so that the line 57 forms a proper reference for movement of the lining unit 37 which, in this embodiment, is preferably arranged closer to the rear carriage 35 than the front carriage 38.

The installation of the laser beam reference plane will be facilitated by the use of optical and/or acoustical control signals indicating the proper spacing from the fixed points 46 and 47.

The embodiment of the laser beam receiver 21 shown in FIG. 10 is designed for a laser beam 16a consisting of two perpendicularly intersecting planar beam portions. The light- and/or temperature sensitive cells or elements 58 of the receiver are distributed in quadrants surrounding an imaginary cross centered on the receiver and corresponding to the cross section of the laser beam. Thus, when the beam deviates from its centered position, it will promptly impinge on one or more elements 58 producing a signal to indicate such deviation.

In the embodiment of the laser beam receiver shown in FIG. 11, a cross sectionally L-shaped laser beam 16' is to be sensed, the two legs of the L having positioned adjacent thereto light sensitive elements 58 and temperature sensitive elements 58'. Any movement of the laser beam off center, as indicated by the horizontal and vertical arrows, will produce a corresponding signal as soon as one or both legs of the beam impinge upon one or more of the elements 58 and/or 58'.

FIG. 12 shows an embodiment of a laser beam receiver 21 designed to sense two parallel, spaced-apart laser beams 16'', 16''. In this receiver, two centrally positioned light- and/or temperature sensitive elements 58'', 58'' are provided on the receiver intermediate the two laser beams. As the two coordinated laser beams move off center in a vertical direction, one or the other beam will impinge on a respectively adjacent element 58'' to produce a corresponding signal.

FIG. 13 shows a horizontally extending, planar laser beam 16 which constitutes a true datum or reference for leveling or grading the track in respect thereto.

FIG. 14 shows a track liner with a mobile machine frame 60 having running gears 61 moving on track 3 to be lined by means of roller lining unit 62 whose flanged wheels engage the rails. A bogie 63 runs on the track in the region of the track lining means 62 and serves as the forward anchor of the shorter reference chord 64, similarly to the embodiment of FIG. 5. As in the other embodiments and forming part of the lining reference system, the bogie 63 may be pressed into engagement with the selected grade rail to assure the accuracy of the reference point. The shorter chord 64 extends rearwardly to rear carriage 66 which also anchors the rear end point of the second, longer reference chord 65 whose forward end point is anchored to front carriage 67.

Forming part of the lining reference system, the carriages 66 and 67 also have flanged wheels with which they may engage the selected grade rail under lateral pressure so that each point of the reference system produces an accurate reference defined by the grade rail. As previously pointed out, the lateral pressure may be exerted by preferably hydraulically operating jacks which may either be double-acting or constitute a second carriage axle, pressure means of this type and for this purpose being known per se.

The measuring bogie 68 intermediate the rear carriage 66 and the lining unit 62 senses the actual ordinate of the longer chord 65, which is converted into the desired ordinate for shorter chord 64, the ordinate of the shorter chord being in a proportion to that of the longer chord determined by the proportion of the lengths of the two chords, all of which is well known. The track 3 is laterally moved by unit 62 until the desired ordinate of shorter chord 64 at measuring bogie 68 has been reached. The hydraulic motor 62' of unit 62 is automatically controlled by electric control circuit 68' which is actuated by a control signal from control device 68'' associated with chord 64 on bogie 68. The control device may be mechanially operated by the short chord 64 or it may be a rotary potentiometer operated by the chord to produce the desired control signals.

This known lining reference system is positioned in relation to a laser beam 70 extending laterally of the track in the direction of track elongation. For this purpose, the rear station 66 of the lining reference system carries a pivotally mounted support arm for the laser beam source or emitter 69 so that the emitter may be swung into position alongside either rail of the track. A foremost carriage 73 carries a similarly pivotally mounted support arm projecting laterally beyond the selected rail to support the apertured stop 71 in the path of the laser beam. Like carriage 66, the carriage 73 also has flanged wheels which may be laterally pressed into contact with the selected rail. The stop 71 has light- and/or temperature sensitive elements (cells) on both sides of the aperture or slot of the stop to produce control signals which automatically actuate the control drive or servo motor 71' for positioning the stop 71 so that the laser beam is centered or focused on its aperture, the laser beam emitter 69 being simultaneously centered by the control signals via conrol circuit 72'.

A laser beam reflector 74 is mounted on the stop 71 behind its aperture to deflect the laser beam passing through the aperture when it is properly focused by the above-described automatic control or centering means. Carriage 73 mounts a second reflector 74' roughly in vertical alignment with the center line of the track, the two reflectors being arranged to deflect the laser beam each time by 90°, i.e. to return it from reflector 74' in the same direction whence it arrived, i.e. back towards the previously lined track section.

Front carriage 67 of the linging reference system carries a laser beam receiver or target 75 whereon the laser beam coming from reflector 74' impinges. The target 75 is fixedly connected to the anchor 75a of the forward end of longer reference chord 65 and is laterally movable therewith on carriage 67. This target 75, too, has light- and/or temperature sensitive elements whose control signals automatically center the target in respect of the laser beam so that the forward end of the longer reference chord 65 is automatically moved into a desired lateral position at which it is at exactly the same lateral distance from laser beam 70 as the rear end of the chord 65 is from the beam in the lined track section. As is known, the ordinate of the curve must be taken into consideration when the apparatus works in a track curve.

If desired, the laser beam reflectors 74 and 74' may be replaced by a target at 74 and an independent laser beam emitter at 74' which has a fixed distance to the target at 74. This modification is functionally equivalent to the one above-described since, in fact, the reflector 74 can be considered a laser beam target and the reflector 74' a laser beam emitter.

In the track liner of FIG. 15, a very simple lining reference system is used, like reference numerals in this figure designating parts that function in the same manner as in the embodiment of FIG. 14. The datum line for the reference system is again provided by laser beam 70 generated by emitter 69 and passing through apertured stop 71 to target 74. As in previously described embodiments, the emitter 69 may carry a sight 23 for coarse focusing on target 74. The laser beam emitter and target are mounted on fixed points 46 and 47 adjacent the track so that the laser beam datum line requires no further auxiliary devices to determine its position. A signal, such as warning light 74", may be provided at the laser beam target 74 to enable an operator to adjust the position of the laser beam emitter 69 as to focus or center the beam on the target or a spotboard connected thereto.

The laser beam sensing means is an apertured stop 71 mounted in the path of the beam and is laterally pressed by jack 41 against the grade rail of the track 3 so as to indicate the actual position of the track to be lined. The stop carries light- and/or temperature sensitive elements 72 laterally adjacent the aperture of the stop (and the laser beam) so as to produce control signals when the beam deviates from the centered position, which signals actuate control circuit 72' operating control or servo motor 77 for the double-acting jack 62' of the lining unit 62. The electric motor 77 operates a hydraulic supply and valve system 77' for controlling the operation of jack 62'. The track 3 is laterally moved by the unit 62 until the laser beam 70 passes through the aperture of stop 71, at which time the elements 72 emit no control signals. The stop may be laterally moved so as to compensate for the ordinate in track curves, i.e. the greater distance of the curved track from the straight datum line or plane.

FIG. 16 illustrates a very useful embodiment of a track working apparatus wherein a single laser beam datum cooperates with a series of sensing means spaced along the track elongation in the path of the beam so that the same beam may be used for a variety of purposes along the track, i.e. for leveling, lining, recording or merely indicating the track position. For this purpose, it is particularly advantageous if the laser beam 16 is of cruciform or L-shaped cross section, such as shown in FIGS. 10 and 11, so that the spaced laser beam sensing means may intercept different cross sectional portions of the beam. Such sensing means may be arranged, if desired, on a series of different track working machines advancing along the track in the same working direction but being otherwise independent of each other, particularly since the reach of a laser beam may extend to more than 600 feet.

The track working apparatus schematically shown in the top view of FIG. 16 includes a combined tamper-leveler-liner similar to the one illustrated in FIGS. 1 and 2 but comprising two lining units 6 and 62. Since the same reference numerals are used to designate like parts functioning in a like manner, redundancy will be avoided in the description of this figure by referring to the preceding description of FIGS. 1 to 3, the laser beam being of cruciform cross section.

Seen in the working direction, the laser beam is first intercepted by sensor 20 which may have the form shown in FIG. 3 and intercepts that horizontal leg of the beam which extends inwardly toward the track. When impinging upon the light- and/or temperature sensitive elements of the sensor 20, this leg of the laser beam will produce control signals acutating control circuit 29 to adjust the vertical position of light emitter 11. This will cause the light beam 12, which is used as a reference line for leveling the track, to assume a position parallel to the desired level of the track 3.

The next sensor 20a is spaced rearwardly of sensor 20 and is arranged to intercept the upwardly extending leg of the cruciform laser beam 16. It is associated with the roller lining unit 6 which laterally moves the track to produce at least coarse lining. The jack 9 of the lining unit is operated by the servo motor 76 which is actuated by control circuit 75' receiving the control signals from the sensor 20a.

The third and rearmost sensor 20b is associated with the roller lining unit 62 and is arranged to intercept the downwardly extending leg of the cruciform laser beam. The control signals from the sensor are fed to control circuit 76' operating relay 78 for controlling the lateral movement of the unit 62 which may be used for fine lining the track.

The portion of the laser beam 16 which has not been intercepted by sensors 20, 20a and 20b, particularly its center and remaining parts of its legs, are received by receiver 21 and used to center or focus the same in respect of emitter 17. This receiver is mounted on a laterally projecting support arm 79 on rearmost carriage 80 on which the support arm is mounted for lateral movement in respect of the track so that the receiver 21 has the same distance from the center line or grade rail of the track as the emitter 17 whereby the laser beam 16 assumes a position parallel to the center line of the track in a vertical and horizontal direction. All parts of the reference system requiring an accurate relationship with the actual position of track 3 are provided with biasing or pressure means 41 enabling such parts to be pressed into contact with the grade rail.

Figure 18:
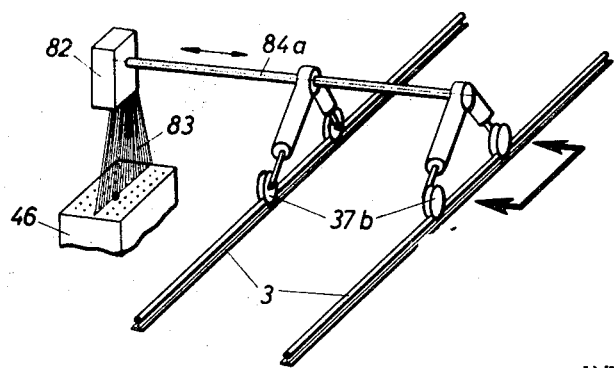

FIGS. 17 and 18, finally, illustrate track work carried out according to the principles of the present invention, using solely a fixed point 46 along the track as datum for the work.

As shown, a front carriage 38a runs on track 3 and carries a support frame 81 for the laser beam emitter 82. The emitter 82 is mounted at the outward end of a support arm 84 being laterally movable by a spindle drive operated by servo motor 84' which may be remote controlled. The carrier 81' of the support arm may be pivoted about a vertical axis so that the emitter 82 may be swung into association with either one of the track rails. As in all embodiments, the carriage 38a, which forms part of the reference system, is pressed into contact with the selected grade rail to form an accurate reference basis according to the actual position of the track. The planar laser beam 83, which flares outwardly, is focussed vertically downwardly against the fixed receiver 46.

The track lining in reference to the laser beam 83 is effected by the two-chord system more fully described hereinabove and known per se, which includes the chords 42 and 44 cooperating in the manner described in connection with FIG. 5, like reference numerals designating like parts functioning in a like manner to avoid redundancy in the description. The forward anchor point 42' of the longer chord 42 is fixedly connected with the laterally movable support arm 84 and thus is moved therewith into the desired position of the track, regardless of the actual position of the track at this point, as long as the lateral position of the sender is adjusted into vertical alignment with the fixed track point 46. This imparts the desired alignment to the entire chord 42 since its rear anchor is on carriage 35a in the previously lined track section.

As soon as the chord 42 has assumed the correct position or alignment, the track may be laterally moved by track lining unit 37a until the forward end of the shorter reference chord 44, which is anchored to the bogie 37' at the lining unit 37a and moves laterally therewith, has moved the chord so that the ordinate ratio at the measuring bogie 36a, which includes the probes 36' for the chords, has the desired value. Operator 85 actuates the control 86 which is connected to servo motor 84' by control circuit 87 to move the support arm 84 transversely of the track until he ascertains visually that the planar laser beam 83 is in alignment with the fixed receiver 46.

In the extremely simple track liner of FIG. 18, a roller lining unit 37b has journaled therein a laterally movable support arm 84 carrying the laser beam emitter 82. The planar laser beam is again downwardly focussed on fixed receiver 46. The track lining unit 37b has the usual double flanged wheels gripping the rail heads and a double-acting jack (not shown) for laterally moving the wheels in either lateral direction to line the track, the lateral stroke of the unit being terminated when the laser beam 83 is in alignment with the aperture or other marker on receiver 83, which may be visually determined, the arm 84a and emitter 82 moving laterally with the unit during the lining stroke.

We claim:

1. A track surveying apparatus for indicating a desired correction of the position of an uncorrected track section in relation to a laser beam datum, comprising
    1. a laser beam emitter positioned in the uncorrected track section;
    2. means for controlling the path of the laser beam;
    3. means for pressing the laser beam path controlling means into a measurably fixed relationship to a selected grade rail of the track section; and
    4. a reference system indicating the desired position of the track section,
        a. the reference system including an end movable in relation to the track section, and
        b. the movable reference system end being connected to the laser beam path controlling means for moving the end in dependence on the laser beam path.

2. The track surveying apparatus of claim 1, wherein the laser beam path controlling means comprises laser beam sensitive elements producing indicating signals upon impingement of the laser beam on said elements.

3. The track surveying apparatus of claim 2, further comprising a recording instrument for recording the indicating signals.

4. The track surveying apparatus of claim 2, wherein the laser beam emitter is arranged to emit a laser beam extending in at least one plane, and the laser beam sensitive elements are arranged to intercept the laser beam only partially.

5. The track surveying apparatus of claim 4, wherein the laser beam extends in two perpendicularly intersecting planes.

6. The track surveying apparatus of claim 5, wherein the intersecting laser beam planes meet along a common axis extending in the direction of track elongation.

7. The track surveying apparatus of claim 4, wherein the last beam emitter is arranged to emit two parallel planar laser beams.

8. The track surveying apparatus of claim 2, wherein the laser beam sensitive elements are arranged about a central region of the laser beam both controlling means, and said signals automatically centering the laser beam path controlling means in respect of the laser beam.

9. The track surveying apparatus of claim 2, further comprising a servo motor responsive to the signals for adjusting the emitter.

10. The track surveying apparatus of claim 1, further comprising means for pressing the laser beam emitter into a measurably fixed relationship to a selected grade rail of the track section.

11. The track surveying apparatus of claim 10, further comprising a forward carriage in the uncorrected track section supporting the laser beam emitter; a laser beam target in the path of the laser beam; a rear carriage in a previously corrected track section and supporting the laser beam target; and means for pressing the rear carriage into a measurably fixed relationship to the selected grade rail.

12. The track surveying apparatus of claim 1, wherein the laser beam path controlling means comprises laser beam sensitive elements producing indicating signals upon impingement of the laser beam on said elements, and a remote control for aligning the laser beam emitter with the elements in response to the signals.

13. A track surveying apparatus for indicating a desired correction of the position of an uncorrected track section in relation to a laser beam datum, comprising
1. a laser beam emitter positioned in the uncorrected track section;
2. a support for supporting the laser beam emitter,
   a. the support being adjustable in respect of a selected grade rail of the track section and
   b. the support being movable along the track section;
3. a laser beam target comprising laser beam sensitive elements producing indicating signals upon impingement of the laser beam on said elements, alignment of the laser beam with selected ones of the elements controlling the path of the laser beam,
   a. the position of the target being fixed in relation to the grade rail; and
4. a reference system indicating the desired position of the track section connected to the laser beam emitter support for adjusting the reference system in response to the support adjustment upon alignment of the laser beam with the selected elements.

14. The track survey apparatus of claim 13, further comprising a remote control for adjusting the laser beam emitter support.

* * * * *